(12) United States Patent
Peacock

(10) Patent No.: US 8,037,291 B2
(45) Date of Patent: Oct. 11, 2011

(54) MASTER BOOT RECORD MANAGEMENT

(75) Inventor: Eric Peacock, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1153 days.

(21) Appl. No.: 11/699,252

(22) Filed: Jan. 29, 2007

(65) Prior Publication Data

US 2008/0184022 A1     Jul. 31, 2008

(51) Int. Cl.
*G06F 15/177* (2006.01)

(52) U.S. Cl. ............. 713/2; 713/100; 714/4.11; 714/15; 717/120; 717/173

(58) Field of Classification Search .................. 713/1, 2, 713/100; 714/6, 15, 4.11; 717/120, 173, 717/178
See application file for complete search history.

(56) References Cited

U.S. PATENT DOCUMENTS

| 5,022,077 | A | | 6/1991 | Bealkowski et al. |
| 5,210,875 | A | * | 5/1993 | Bealkowski et al. ............. 713/2 |
| 5,537,540 | A | * | 7/1996 | Miller et al. ..................... 714/38 |
| 6,205,527 | B1 | | 3/2001 | Goshey |
| 6,205,558 | B1 | * | 3/2001 | Sobel ............................. 714/15 |
| 6,532,538 | B1 | * | 3/2003 | Cronk et al. ...................... 713/2 |
| 6,792,556 | B1 | | 9/2004 | Lowell |
| 6,963,951 | B2 | * | 11/2005 | Ng et al. ....................... 711/112 |
| 7,216,251 | B2 | * | 5/2007 | Gaunt et al. ...................... 714/6 |
| 7,565,523 | B2 | * | 7/2009 | Han .................................. 713/2 |
| 2002/0124245 | A1 | * | 9/2002 | Maddux et al. ............... 717/176 |
| 2002/0166059 | A1 | * | 11/2002 | Rickey et al. ................. 713/200 |
| 2006/0123223 | A1 | * | 6/2006 | Mayfield et al. .................. 713/2 |

OTHER PUBLICATIONS

"Backup Master Boot Record for Virus Recovery"—TDB No. NNRD41997—Mar. 1, 1999—vol. 42—Issue 419.*
"How to re-install windows whithout spoiling Linux"—Google groups—Jul. 6, 2000.*
Kitchen Table Computers—How to Build Your Own Personal Computer: "Dual-Booting Windows and Linux"—Jan. 2005.*
Stolten dot com: "Reinstalling Windows in A Dual Boot System"—Nov. 3, 2006.*

* cited by examiner

*Primary Examiner* — Thuan Du

(57) ABSTRACT

In one embodiment a computer system comprises a processor and a memory module coupled to the processor and comprising logic instructions stored in a computer readable medium. The logic instructions, when executed, configure the processor to initiate power on self test processing in the basic input/output system of a computing device, compare a first identifier derived from a master boot record on the computing device with a second identifier stored in a memory location on the computing device, and implement a master boot record recovery process when the first identifier does not correspond with the second identifier.

18 Claims, 3 Drawing Sheets

MASTER BOOT RECORD MANAGEMENT

BACKGROUND

Some computer systems utilize a defined sector of a hard drive disk, commonly referred to as the master boot record (MBR), during the boot up process. For example, during the boot-up process a computer system's basic input/output system (BIOS) may load program instructions, commonly referred to as a boot loader, from the MBR during the boot process. Further, the program instructions in the MBR invoke a specialized program commonly referred to as a boot loader, which continues the boot-up process.

Some manufacturers of computer systems customize the MBR on their computer systems. For example, the MBR may be customized to implement failover or recovery procedures that are specific to the manufacturer or to the computer system architecture. Subsequent software upgrades to a computer system may overwrite the customized MBR which, in turn, may create technical problems for the computer system. Thus, techniques to manage updates to the MBR would find utility.

DETAILED DESCRIPTION

Described herein are exemplary system and methods for master boot record management in a computing system. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1:
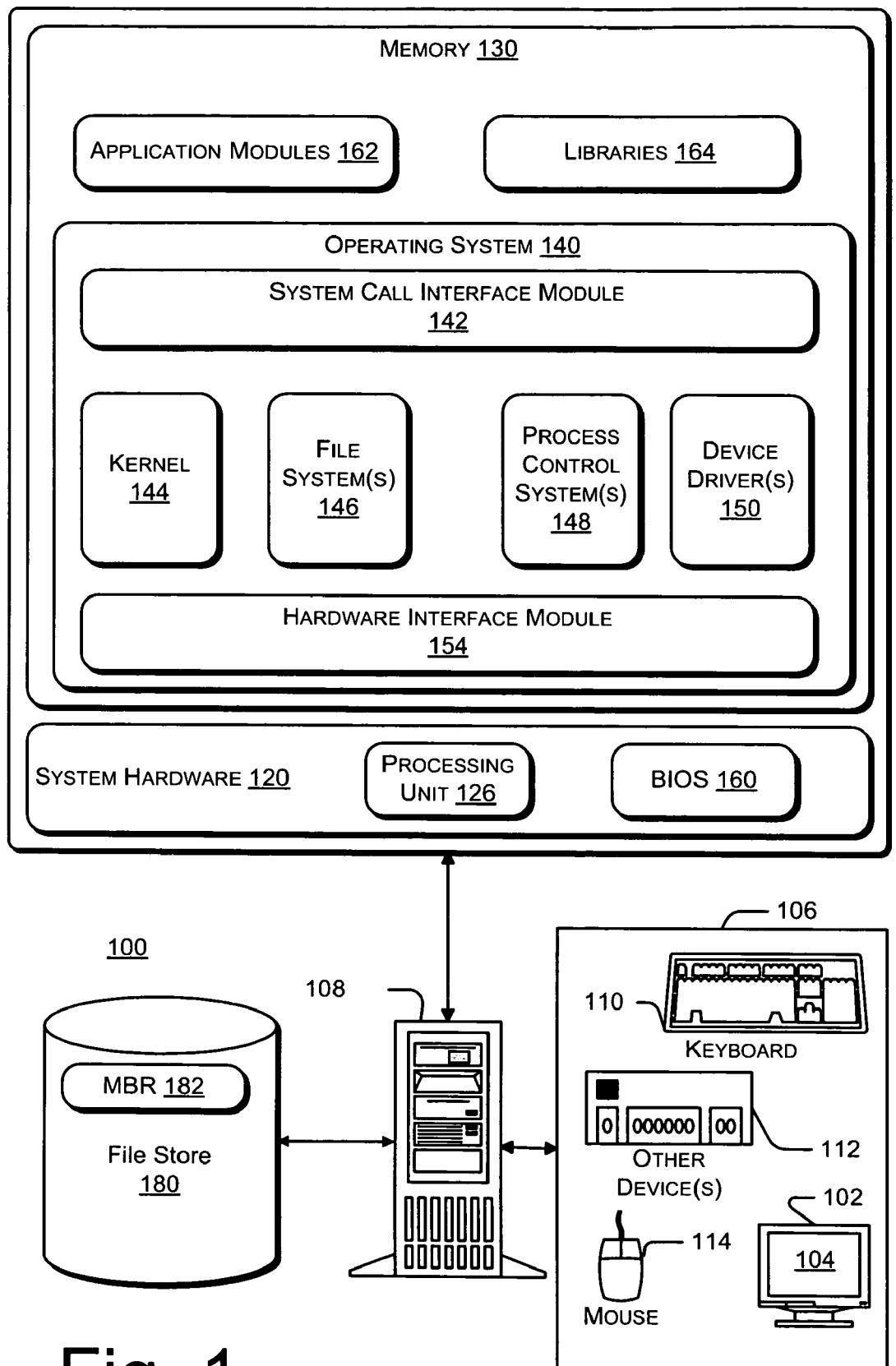
FIG. 1 is a schematic illustration of one embodiment of a BIOS security management system.

FIG. 1 is a schematic illustration of an illustration of a computing system 100 adapted to include master boot record management. In the illustrated embodiment, system 100 may be embodied as a hand-held or stationary device for accessing the Internet, a desktop PCs, notebook computer, personal digital assistant, or any other processing devices that have a basic input/output system (BIOS) or equivalent.

The computing system 100 includes a computer 108 and one or more accompanying input/output devices 106 including a display 102 having a screen 104, a keyboard 110, other I/O device(s) 112, and a mouse 114. The other device(s) 112 can include a touch screen, a voice-activated input device, a track ball, and any other device that allows the system 100 to receive input from a developer and/or a user. The computer 108 includes system hardware 120 including a processing unit 126 and random access memory and/or read-only memory 130.

A file store 180 is communicatively connected to computer 108. File store 180 may be internal such as, e.g., one or more hard drives, or external such as, e.g., one or more external hard drives, network attached storage, or a separate storage network. File store 180 comprises a master boot record 182. In some embodiments, the MBR may be a dedicated sector or sectors of the file store 180. For example, in some computer systems the master boot record is the first sector of a data storage device such as on the hard disk.

Memory 130 includes an operating system 140 for managing operations of computer 108. In one embodiment, operating system 140 includes a hardware interface module 154 that provides an interface to system hardware 120. In addition, operating system 140 includes a kernel 144, one or more file systems 146 that manage files used in the operation of computer 108 and a process control subsystem 148 that manages processes executing on computer 108. Operating system 140 further includes one or more device drivers 150 and a system call interface module 142 that provides an interface between the operating system 140 and one or more application modules 162 and/or libraries 164. The various device drivers 150 interface with and generally control the hardware installed in the computing system 100.

In operation, one or more application modules 162 and/or libraries 164 executing on computer 108 make calls to the system call interface module 142 to execute one or more commands on the computer's processor. The system call interface module 142 invokes the services of the file systems 146 to manage the files required by the command(s) and the process control subsystem 148 to manage the process required by the command(s). The file system(s) 146 and the process control subsystem 148, in turn, invoke the services of the hardware interface module 154 to interface with the system hardware 120. The operating system kernel 144 can be generally considered as one or more software modules that are responsible for performing many operating system functions.

The particular embodiment of operating system 140 is not critical to the subject matter described herein. Operating system 140 may be embodied as a UNIX operating system or any derivative thereof (e.g., Linux, Solaris, etc.) or as a Windows® brand operating system.

Computing system 100 further includes a basic input/output system (BIOS) 160. In one embodiment, BIOS 160 may be implemented in flash memory and may comprise a power-on self-test (POST) module for performing system initialization and tests. In operation, when activation of computing system 100 begins processing unit 126 accesses BIOS 160 and shadows the instructions of BIOS 160, such as power-on self-test module, into operating memory. Processor 160 then executes power-on self-test operations to implement POST processing.

Figure 2:
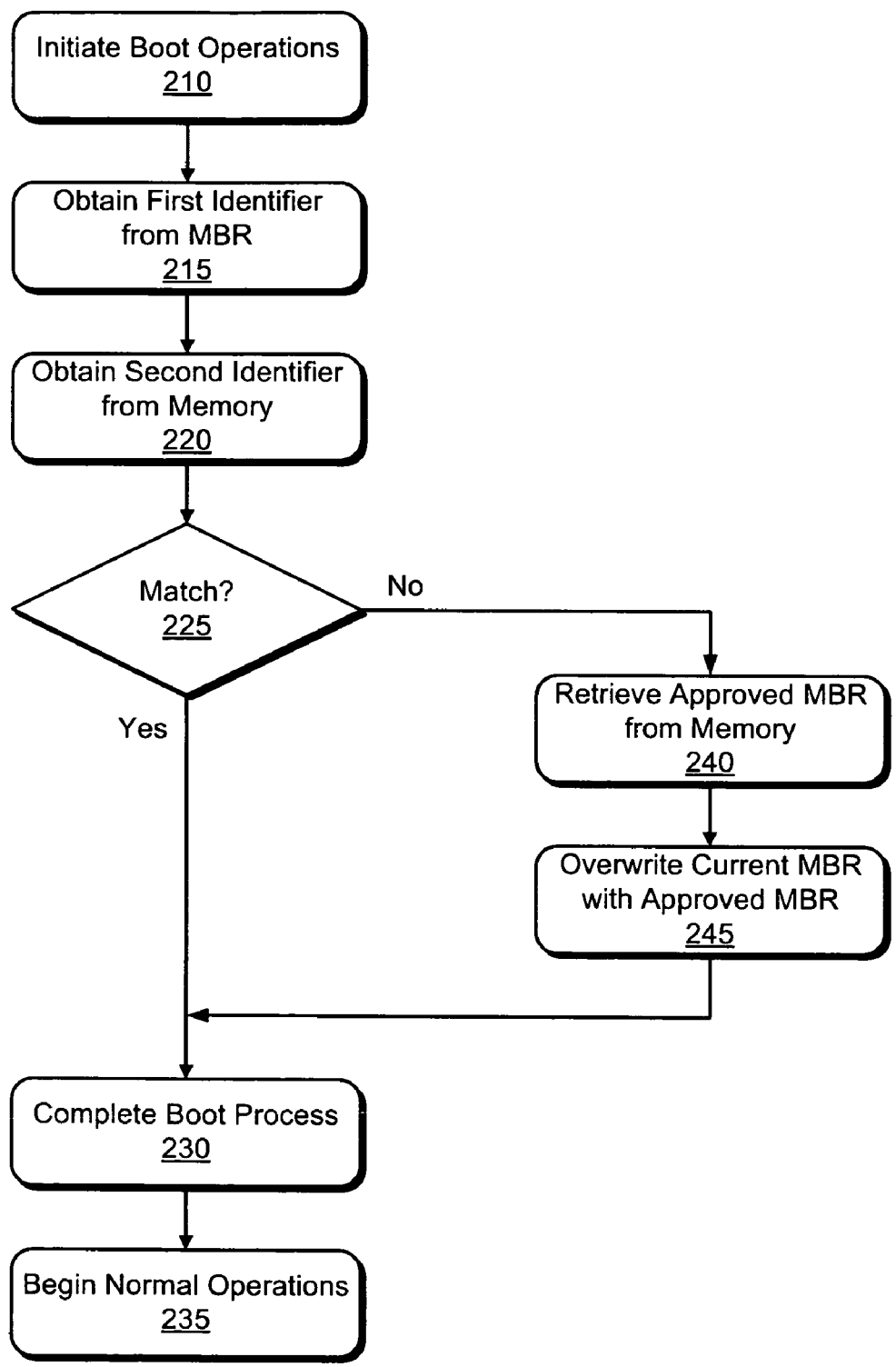
FIG. 2 is a flowchart illustrating operations in one embodiment of implementing master boot record management.

FIG. 2 is a flowchart illustrating operations in one embodiment of implementing master boot record management. In one embodiment, the operations of FIG. 2 may be implemented during the boot up process of the computer system 100 by the BIOS 160, a boot loader, or any other code involved in the boot up process. The operations of FIG. 2 determine whether the master boot record has been modified since the previous boot operation and, if so, overwrite the current master boot record with an approved master boot record. Certain portions of the MBR, for example the partition table and disk signature, may optionally be retained.

Referring to FIG. 2, at operation 210, boot operations are initiated on computer system 100. For example, the system BIOS 160 may initiate operations to boot the computer system 100. At operation 215 a first identifier is obtained from the master boot record. In some embodiments the first identifier may be an identifier that uniquely identifies the master boot record. For example, the first identifier may be implemented as a checksum calculated from some or all of the data stored in the master boot record. Alternatively, the first identifier may be a cyclical redundancy check (CRC) or a digital signature calculated from some or all of the data stored in the master boot record. Alternatively a simple direct comparison of part or all of the MBR may be performed.

At operation 220 a second identifier is obtained from memory. For example, in some embodiments the computer system may calculate the second identifier using a checksum, CRC, or digital signature technique on data in the master boot record and may store the second identifier in a memory location on the computer system 100. The second identifier may be calculated when the operating system is installed, either by the manufacturer of the computer system 100 or by a consumer.

If, at operation 225, the first identifier and the second identifier match, then control passes to operation 230 and the computer system 100 completes the boot process and, at operation 235, continues with normal operations.

By contrast, if at operation 225 the first identifier and the second identifier do not match, then control passes to operation 240 and an approved master boot record is retrieved from memory. For example, in some embodiments the computer system 100 may store a copy of data from the original master boot record in a memory location accessible during the boot up operation. The memory location may be in magnetic memory, e.g., on the file store 180, or in electronic memory location, e.g., in RAM or in a memory location associated with BIOS 160. At operation 245 the current master boot record is replaced with the contents of the approved master boot record retrieved from memory.

In some embodiments the computer system may implement a process to notify a user of the computer system that the current master boot record will be replaced with an approved master boot record. For example, the computer system may generate an alert which may be displayed on monitor 104. In addition, the system may request permission from the user to replace the current master boot record with the approved master boot record. For example, the computer system may require the user to enter one or more keystrokes on the keyboard 110 or to select a particular section of the monitor 104 to approve the new master boot record.

In some embodiments the computer system may calculate a new identifier from the data in the approved master boot record. The identifier may be stored in a memory location in the computer system 100, and may be used as the second identifier in subsequent boot operations.

Thus, the operations of FIG. 2 permit the computer system 100 to determine whether the master boot record has been changed, e.g. by a software update process or the like, and to rewrite the current master boot record with an approved master boot record.

Figure 3:
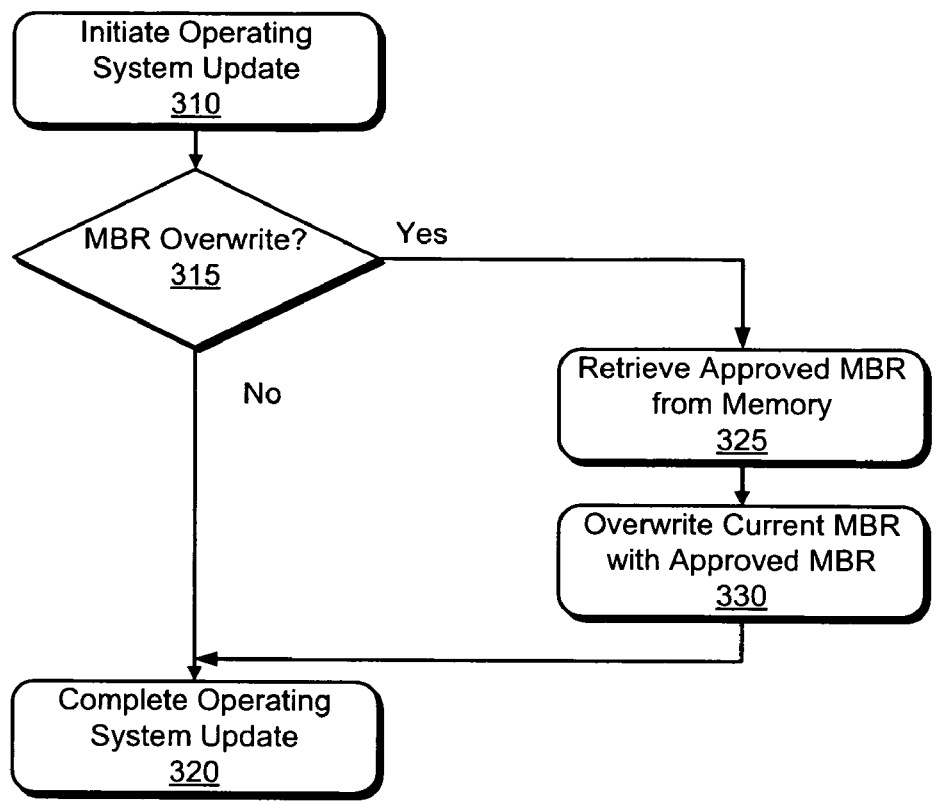
FIG. 3 is a flowchart illustrating operations in one embodiment of implementing master boot record management.

FIG. 3 is a flowchart illustrating operations in another embodiment of implementing master boot record management. In one embodiment, the operations of FIG. 3 may be implemented by the processing unit 126 during a software update process, e.g., an operating system upgrade. The operations of FIG. 3 determine whether the software upgrade process modifies the master boot record and, if so, overwrites the updated master boot record with an approved master boot record. Alternatively the MBR may be reset to the original after an operating system upgrade.

Referring to FIG. 3, at operation 310, a software update process, e.g., a operating system update, is initiated on computer system 100. For example, a user of the system 100 may choose to update the operating system by downloading one or more updates/upgrades via a network, e.g., the internet. Alternatively, a user of the computer system 100 may decide to install a new operating system stored on a computer readable medium, e.g., a CD-ROM.

In some embodiments a test may be implemented, at operation 315 to determine whether the software update process overwrites data in the master boot record and/or boot configuration data. If, at operation 315, the software update process does not overwrite data in the master boot record, then control passes to operation 320 and the operating system update process continues.

By contrast, if at operation 315 the software update process overwrites data in the master boot record, then control passes to operation 325 and an approved master boot record is retrieved from memory. For example, in some embodiments the computer system 100 may store a copy of data from the original master boot record in a memory location accessible during the update process operation. The memory location may be in magnetic memory, e.g., on the file store 180, or in electronic memory location, e.g., in RAM or in a memory location associated with BIOS 160. At operation 330 the master boot record installed during the update process is replaced with the contents of the approved master boot record retrieved from memory.

In some embodiments the computer system may implement a process to notify a user of the computer system that the master boot record installed during the update process will be replaced with an approved master boot record. For example, the computer system may generate an alert which may be displayed on monitor 104. In addition, the system may request permission from the user to replace the master boot record installed during the update process with the approved master boot record. For example, the computer system may require the user to enter one or more keystrokes on the keyboard 110 or to select a particular section of the monitor 104 to approve the new master boot record.

In some embodiments the computer system may calculate an identifier from the data in the approved master boot record. The identifier may be stored in a memory location in the computer system 100, and may be used as the second identifier in subsequent boot operations, as illustrated in FIG. 2.

Thus, the operations of FIG. 3 permit the computer system 100 to determine whether the master boot record has been changed during a software update process or the like, and to rewrite the changed master boot record with an approved master boot record.

In some embodiments the master boot record can be rewritten on every upgrade, which renders the test implemented at operation 315 unnecessary. For example, if the operating system is an update to a Windows® operating system the files oobe.cmd or unattend.xml on file store 180 can be pre-populated in such a way that part or all of the original MBR and boot configuration BCD data is rewritten after an upgrade.

Figure 4:
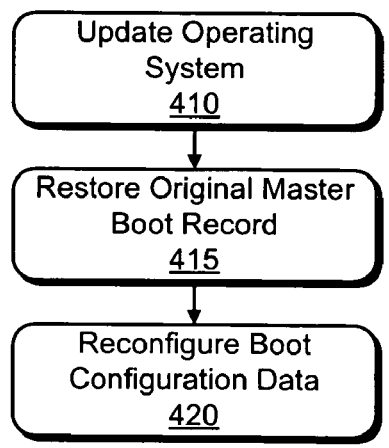
FIG. 4 is a flowchart illustrating operations in one embodiment of implementing master boot record management.

FIG. 4 is a flowchart illustrating operations in one embodiment of implementing master boot record management. Referring to FIG. 4, at operation 410 an operating system is updated, for example using any of the techniques described above. At operation 415 the original master boot record is restored. For example, if the operating system update is an update to a Windows® operating system, the files oobe.cmd or unattend.xml may be modified to include logic instructions which, when executed, invoke a routine that retrieves an approved master boot record from memory and overwrites the current master boot record with the approved master boot record retrieved from memory, substantially as described with referenced to operations 325 and 330.

At operation 420 the boot configuration data is reconfigured. For example, in a Windows® environment the boot.ini file may need to be restored to the original configuration. Similarly, in a Windows® Vista environment the boot configuration data (BCD) registry may be restored to the original configuration.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method, comprising:
   upgrading software in a computing device during a software update process;
   initiating power on self test processing in a basic input/output system of the computing device;
   computing a first identifier from content of a current version of a master boot record on the computing device, wherein the master boot record was modified by the software update process;
   comparing the first identifier with a second identifier stored in a memory location on the computing device; and
   implementing a master boot record recovery process in response to detecting that the first identifier does not correspond with the second identifier.

2. The method of claim 1, wherein the first identifier comprises at least one of a checksum, a cyclical redundancy check value, or a digital signature; and
   wherein comparing the first identifier with the second identifier comprises retrieving, from the memory location, the second identifier, wherein the second identifier comprises at least one of a checksum, a cyclical redundancy check value, or a digital signature obtained from a previous version of the master boot record on the computing device.

3. The method of claim 1, wherein implementing the master boot record recovery process comprises overwriting a portion of the current version of the master boot record.

4. The method of claim 3, wherein implementing the master boot record recovery process comprises requesting confirmation from a user before overwriting the portion of the current version of the master boot record.

5. The method of claim 3, further comprising calculating a new identifier associated with the overwritten master boot record.

6. The method of claim 1, wherein upgrading the software comprises upgrading an operating system.

7. The method of claim 6, further comprising:
   downloading an operating system update via a network connection;
   installing the operating system update to upgrade the operating system.

8. The method of claim 1, wherein the power on self test processing is part of a boot process, and wherein the master boot record recovery process comprises accessing a second version of the master boot record from a storage location during the boot process and overwriting at least a portion of the current version of the master boot record using the accessed second version of the master boot record.

9. A computer system, comprising:
   a basic input/output system;
   a processor; and
   a memory module coupled to the processor and comprising logic instructions which, when executed, configure the processor to:
   upgrade software in the computer system during a software update process;
   initiate power on self test processing in the basic input/output system;
   compute a first identifier from content of a current version of a master boot record, wherein the master boot record was modified by the software update process;
   compare the first identifier with a second identifier stored in a memory location of the computer system; and
   implement a master boot record recovery process in response to detecting that the first identifier does not correspond with the second identifier.

10. The computer system of claim 9, further comprising logic instructions which, when executed, configure the processor to:
    retrieve, from the memory location, the second identifier, wherein the second identifier was obtained from a previous version of the master boot record, and wherein the first and second identifiers each comprises at least one of a checksum, a cyclical redundancy check value, or a digital signature.

11. The computer system of claim 9, further comprising logic instructions which, when executed, configure the processor to overwrite a portion of the current version of the master boot record.

12. The computer system of claim 11, further comprising logic instructions which, when executed, configure the processor to request confirmation from a user before overwriting the portion of the current version of the master boot record.

13. The computer system of claim 9, further comprising logic instructions which, when executed, configure the processor to calculate a new identifier associated with the overwritten master boot record.

14. The computer system of claim 9, wherein the software comprises an operating system, the computer system further comprising logic instructions which, when executed, configure the processor to:
    download an operating system update via a network connection;
    install the operating system update to upgrade the operating system.

15. The computer system of claim 9, wherein the power on self test processing is part of a boot process, and wherein the master boot record recovery process comprises access of a second version of the master boot record from a storage location during the boot process and overwriting of at least a portion of the current version of the master boot record using the accessed second version of the master boot record.

16. A computer-readable storage medium storing instructions that upon execution cause a computer to:
    upgrade software in the computer during a software update process;
    initiate power on self test processing in a basic input/output system of the computer;
    compute a first identifier from content of a current version of a master boot record in the computer, wherein the master boot record was modified by the software update process;
    compare the first identifier with a second identifier stored in a memory location in the computer; and
    implement a master boot record recovery process in response to detecting that the first identifier does not match the second identifier.

17. The computer-readable storage medium of claim 16, wherein upgrading the software comprises upgrading an operating system.

18. The computer-readable storage medium of claim 16, wherein the power on self test processing is part of a boot process, and wherein the master boot record recovery process comprises accessing a second version of the master boot record from a storage location during the boot process and overwriting at least a portion of the current version of the master boot record using the accessed second version of the master boot record.

* * * * *